(12) United States Patent
Ito

(10) Patent No.: US 10,167,899 B2
(45) Date of Patent: Jan. 1, 2019

(54) SINTERED BEARING, FLUID DYNAMIC BEARING DEVICE PROVIDED WITH SAME, AND SINTERED BEARING MANUFACTURING METHOD

(71) Applicant: NTN CORPORATION, Osaka (JP)

(72) Inventor: Fuyuki Ito, Mie (JP)

(73) Assignee: NTN CORPORATION, Osaka (JP)

( * ) Notice: Subject to any disclaimer, the term of this patent is extended or adjusted under 35 U.S.C. 154(b) by 2 days.

(21) Appl. No.: 15/301,019

(22) PCT Filed: Mar. 4, 2015

(86) PCT No.: PCT/JP2015/056320
§ 371 (c)(1),
(2) Date: Sep. 30, 2016

(87) PCT Pub. No.: WO2015/151698
PCT Pub. Date: Oct. 8, 2015

(65) Prior Publication Data
US 2017/0023059 A1  Jan. 26, 2017

(30) Foreign Application Priority Data

Apr. 4, 2014  (JP) .................................. 2014-077915

(51) Int. Cl.
*B22F 3/00* (2006.01)
*B22F 3/02* (2006.01)
(Continued)

(52) U.S. Cl.
CPC .............. *F16C 33/128* (2013.01); *B22F 3/17* (2013.01); *B22F 3/24* (2013.01); *B22F 5/106* (2013.01);
(Continued)

(58) Field of Classification Search
CPC ...... F16C 17/102; F16C 17/107; F16C 17/02; F16C 17/026; F16C 33/107; F16C 33/122;
(Continued)

(56) References Cited

U.S. PATENT DOCUMENTS 6,105,250 A * 8/2000 Tanaka .................. B22F 3/1103
29/898.02
8,864,381 B2 * 10/2014 Kokumai ................ F16C 32/06
384/114
(Continued)

FOREIGN PATENT DOCUMENTS

EP       1473475      * 11/2004
JP    2000-224806       8/2000
(Continued)

OTHER PUBLICATIONS

Translation of JP2008039104 obtained Nov. 15, 2017.*
(Continued)

*Primary Examiner* — James Pilkington
(74) *Attorney, Agent, or Firm* — Wenderoth, Lind & Ponack, L.L.P.

(57) ABSTRACT

A sintered bearing (1) of the present invention includes: an inner layer (2) and an outer layer (3) each made of sintered metal and formed into a cylindrical shape; and a radial dynamic pressure generating portion (dynamic pressure grooves 1a1 and 1a2) die-formed in an inner peripheral surface of the inner layer (2), in which the outer layer (3) has compressive yield strength higher than compressive yield strength of the inner layer (2).

5 Claims, 6 Drawing Sheets

(51) Int. Cl.
  *B22F 3/10* (2006.01)
  *B22F 3/17* (2006.01)
  *B22F 3/24* (2006.01)
  *B22F 5/10* (2006.01)
  *B22F 7/00* (2006.01)
  *B22F 7/06* (2006.01)
  *F16C 17/02* (2006.01)
  *F16C 17/10* (2006.01)
  *F16C 33/10* (2006.01)
  *F16C 33/12* (2006.01)
  *F16C 33/14* (2006.01)

(52) U.S. Cl.
  CPC .............. *B22F 7/008* (2013.01); *B22F 7/06* (2013.01); *F16C 17/026* (2013.01); *F16C 17/102* (2013.01); *F16C 17/107* (2013.01); *F16C 33/107* (2013.01); *F16C 33/122* (2013.01); *F16C 33/145* (2013.01); *B22F 2998/10* (2013.01); *F16C 2202/06* (2013.01); *F16C 2204/60* (2013.01); *F16C 2220/20* (2013.01); *F16C 2370/12* (2013.01)

(58) Field of Classification Search
  CPC .. F16C 33/128; F16C 33/145; F16C 2220/20; F16C 2370/12
  See application file for complete search history.

(56) References Cited

U.S. PATENT DOCUMENTS

| | | | |
|---|---|---|---|
| 9,249,830 B2 * | 2/2016 | Mouri | ................ B22F 5/106 |
| 2002/0009242 A1 | 1/2002 | Okamura et al. | |
| 2002/0009243 A1 | 1/2002 | Okamura et al. | |
| 2002/0048418 A1 | 4/2002 | Okamura et al. | |
| 2011/0142387 A1 * | 6/2011 | Sato | ................ F16C 17/107 |
| | | | 384/397 |
| 2015/0010254 A1 | 1/2015 | Mouri et al. | |
| 2016/0108958 A1 | 4/2016 | Mouri et al. | |
| 2016/0348722 A1 | 12/2016 | Mouri et al. | |

FOREIGN PATENT DOCUMENTS

| | | | |
|---|---|---|---|
| JP | 2002-206534 | | 7/2002 |
| JP | 2003-156048 | | 5/2003 |
| JP | 2004-270890 | | 9/2004 |
| JP | 3607661 | | 1/2005 |
| JP | 2005-95979 | | 4/2005 |
| JP | 2008-39104 | | 2/2008 |
| JP | 2010-91002 | | 4/2010 |
| JP | 2011-21649 | | 2/2011 |
| WO | WO2013/133381 | * | 9/2013 |

OTHER PUBLICATIONS

English translation of International Preliminary Report on Patentability and Written Opinion of the International Searching Authority dated Oct. 4, 2016 in International (PCT) Application No. PCT/JP2015/056320.

International Search Report dated Apr. 28, 2015 in International (PCT) Application No. PCT/JP2015/056320.

Extended European Search Report dated Feb. 5, 2018 in corresponding European Patent Application No. 15772922.9.

Chinese Office Action dated Mar. 5, 2018 in corresponding Chinese Patent Application No. 201580014160.4 with English translation of Search Report.

* cited by examiner

SINTERED BEARING, FLUID DYNAMIC BEARING DEVICE PROVIDED WITH SAME, AND SINTERED BEARING MANUFACTURING METHOD

TECHNICAL FIELD

The present invention relates to a sintered bearing, a fluid dynamic bearing device comprising the sintered bearing, and to a method of manufacturing a sintered bearing.

BACKGROUND ART

A fluid dynamic bearing device is configured to relatively rotatably support a shaft member in a non-contact manner by a pressure (dynamic pressure generating action) generated by a fluid film filled in a radial bearing gap defined between an outer peripheral surface of the shaft member and an inner peripheral surface of a bearing member. The fluid dynamic bearing device has advantages in high rotational accuracy and quietness. Thus, the fluid dynamic bearing device is preferably usable for a spindle motor for information equipment (for example, magnetic disk drives such as an HDD, drives for optical discs such as a CD-ROM, a CD-R/RW, a DVD-ROM/RAM, and a Blu-ray Disc, and drives for magneto-optical disks such as an MD and an MO), a polygon scanner motor for a laser beam printer (LBP), a color wheel for a projector, and a small-sized motor such as a fan motor to be used for a cooling fan or the like of an electrical apparatus.

As the bearing member to be used for such a fluid dynamic bearing device, a sintered bearing made of sintered metal may be used. The sintered bearing can be formed into a near net shape. Thus, finishing can be reduced or omitted, and hence the sintered bearing can be manufactured at low cost. Further, when dynamic pressure generating grooves are formed in an inner peripheral surface of the sintered bearing, the dynamic pressure generating grooves can be die-formed in the inner peripheral surface of the sintered bearing in a sizing step. Accordingly, formation of the dynamic pressure generating grooves is facilitated as compared to a case of forming the dynamic pressure generating grooves by etching or the like.

In Patent Literature 1 listed below, there is described a specific method of die-forming a radial dynamic pressure generating portion (dynamic pressure generating grooves) in the inner peripheral surface of the sintered bearing. In this method, first, metal powder is subjected to compression molding and then sintered, thereby forming a sintered body (sintered metal material). Then, a core rod having a forming pattern formed in an outer peripheral surface thereof is inserted along an inner periphery of the sintered body, and the sintered body is press-fitted to an inner periphery of a die while the core rod remains inserted along the inner periphery of the sintered body. In this manner, the sintered body is compressed from an outer periphery thereof, and an inner peripheral surface of the sintered body is pressed onto the forming pattern of the core rod. Consequently, the inner peripheral surface of the sintered body is plastically deformed, thereby die-forming the dynamic pressure generating grooves. After that, while the core rod remains inserted along the inner periphery of the sintered body, the sintered body is taken out from the inner periphery of the die. At this time, the sintered body is released from a compressive force that is inwardly applied to the sintered body, and spring back occurs in the sintered body so that the inner peripheral surface of the sintered body is increased in diameter. As a result, the inner peripheral surface of the sintered body is separated from the core rod. Thus, the core rod can be pulled out from the inner periphery of the sintered body without causing interference between the dynamic pressure generating grooves formed in the inner peripheral surface of the sintered body, and the forming pattern of the core rod.

CITATION LIST

Patent Literature 1: JP 3607661 B2

SUMMARY OF INVENTION

Technical Problems

Incidentally, in the fluid dynamic bearing device as described above, when a size of the radial bearing gap is too small, there arise problems of torque increase and rubbing between the inner peripheral surface of the sintered bearing and an outer peripheral surface of a shaft member. In order to avoid the problems, it is necessary to increase the size of the radial bearing gap to a certain extent. However, in the fluid dynamic bearing device, in general, when a radial difference (for example, groove depths of the dynamic pressure generating grooves) in the radial dynamic pressure generating portion, which is to be formed in an inner peripheral surface of the bearing member (sintered bearing), is equivalent to the size of the radial bearing gap, the pressure of the fluid film in the radial bearing gap, that is, bearing rigidity is maximum. In other words, in order to obtain as high bearing rigidity as possible, the groove depths of the dynamic pressure generating grooves correspond to a threshold value of the size of the radial bearing gap. As described in Patent Literature 1, when the sintered body is separated from the core rod using spring back of the sintered body after the dynamic pressure generating grooves are formed, the groove depths of the dynamic pressure generating grooves cannot be larger than an amount of the spring back of the sintered body. As a result, the groove depths of the dynamic pressure generating grooves are limited by physical properties of a material of the sintered body.

For example, when the sintered bearing is made of a material involving a large amount of spring back, that is, a material having a wide elastic region, the groove depths can be increased. However, in this case, the inner peripheral surface of the sintered bearing is less likely to be plastically deformed. As a result, there is a fear in that the dynamic pressure generating grooves are not completely formed by pressing the sintered bearing onto the forming pattern of the core rod, thereby causing reduction in dynamic pressure generating action and reduction in bearing rigidity.

As described above, when the radial dynamic pressure generating portion, such as the dynamic pressure generating grooves, is die-formed in the inner peripheral surface of the sintered bearing, it has been difficult both to increase the groove depths of the dynamic pressure generating grooves, and to increase bearing rigidity by reliably forming the dynamic pressure generating grooves.

In view of the above-mentioned circumstances, it is an object of the present invention to avoid torque increase and contact between the sintered bearing and the shaft member by increasing the radial difference in the radial dynamic pressure generating portion so that a size of the radial bearing gap is increased, and to increase bearing rigidity by reliably forming the radial dynamic pressure generating portion.

Solution to Problem

According to one embodiment of the present invention, which has been devised to achieve the above-mentioned object, there is provided a sintered bearing, comprising: an inner layer and an outer layer each made of sintered metal and formed into a cylindrical shape; and a radial dynamic pressure generating portion die-formed in an inner peripheral surface of the inner layer, wherein the outer layer has compressive yield strength higher than compressive yield strength of the inner layer.

As described above, according to the present invention, the inner layer and the outer layer are formed in the sintered bearing, and the inner layer is made of a material having relatively low compressive yield strength. Thus, the inner layer is easily plastically deformed, and the radial dynamic pressure generating portion can be more reliably die-formed. Meanwhile, the outer layer is made of a material having relatively high compressive yield strength so that an amount of spring back of the outer layer can be increased. Accordingly, even when the inner layer is made of a material involving a small amount of spring back, an amount of spring back of the entire sintered bearing can be increased. Thus, a radial difference in the radial dynamic pressure generating portion can be increased, thereby being capable of increasing a radial bearing gap. Compressive yield strength refers to stress when the material has compressive strain of 0.2% in a stress-strain curve of the material (JIS H7902:2008).

Such a sintered bearing described above can be manufactured through a manufacturing method comprising: a sintered bearing manufacturing method, comprising: a compression molding step of subjecting metal powder to compression molding to form a compact integrally comprising a cylindrical inner layer and an outer layer having compressive yield strength higher than compressive yield strength of the cylindrical inner layer; a sintering step of sintering the compact to form a sintered body; and a sizing step of die-forming a radial dynamic pressure generating portion in an inner peripheral surface of the sintered body. The above-mentioned sizing step comprises: inserting a core rod, which has a forming pattern formed in an outer peripheral surface thereof, along an inner periphery of the sintered body; die-forming the radial dynamic pressure generating portion by press-fitting the sintered body to an inner periphery of a die under a state in which the core rod remains inserted along the inner periphery of the sintered body, compressing the sintered body from an outer periphery thereof to press the inner peripheral surface of the sintered body onto the forming pattern of the core rod, and plastically deforming the inner peripheral surface of the sintered body; separating the inner peripheral surface of the sintered body from the forming pattern of the core rod by taking out the sintered body from the inner periphery of the die under a state in which the core rod remains inserted along the inner periphery of the sintered body to increase the inner peripheral surface of the sintered body in diameter; and separating the sintered body and the core rod from each other.

In the above-mentioned sintered bearing, it is only necessary that the inner layer have a radial dimension (thickness) enabling formation of the radial dynamic pressure generating portion. Thus, a relatively small thickness is sufficient for the inner layer. Meanwhile, in order to secure an amount of spring back of the entire sintered body, it is preferred that the outer layer be as thick as possible. In view of the above, it is preferred that a radial dimension of the outer layer be larger than the radial dimension of the inner layer.

For example, the inner layer is made of copper-iron-based sintered metal, and the outer layer is made of iron-based sintered metal. Thus, compressive yield strength of the outer layer can be set to be higher than compressive yield strength of the inner layer. Note that, copper-iron-based sintered metal refers to sintered metal containing copper and iron as main components, and containing 30 wt % or more of copper and 30 wt % or more of iron. The iron-based sintered metal refers to sintered metal containing 50 wt % or more of iron.

Further, density of the inner layer is set to be lower than density of the outer layer. Thus, compressive yield strength of the outer layer can be set to be higher than compressive yield strength of the inner layer. In this case, the inner layer and the outer layer can be made of sintered metal having the same composition.

A fluid dynamic bearing device comprises the above-mentioned sintered bearing, and a shaft member inserted along an inner periphery of the sintered bearing. The shaft member is relatively rotatably supported by dynamic pressure generating action of a fluid film generated in a radial bearing gap defined between an inner peripheral surface of the sintered bearing and an outer peripheral surface of the shaft member. The fluid dynamic bearing device can increase the radial difference in the radial dynamic pressure generating portion as compared to that of the related-art product. Along with this, the radial bearing gap is increased, thereby being capable of avoiding torque increase and contact between the sintered bearing and the shaft member. Further, the radial dynamic pressure generating portion is reliably formed in the inner peripheral surface of the sintered bearing, thereby being capable of increasing a pressure of a fluid film and consequently increasing bearing rigidity.

Advantageous Effects of Invention

As described above, according to the present invention, the amount of spring back of the sintered bearing can be increased. As a result, the radial difference in the radial dynamic pressure generating portion die-formed in the inner peripheral surface of the sintered bearing can be increased. Along with this, the radial bearing gap is increased, thereby being capable of avoiding torque increase and contact between the sintered bearing and the shaft member. Further, the inner layer is made of a material that is likely to be plastically deformed. Thus, the radial dynamic pressure generating portion can be reliably formed in the inner layer, thereby being capable of increasing bearing rigidity.

DESCRIPTION OF EMBODIMENTS

Figure 1:
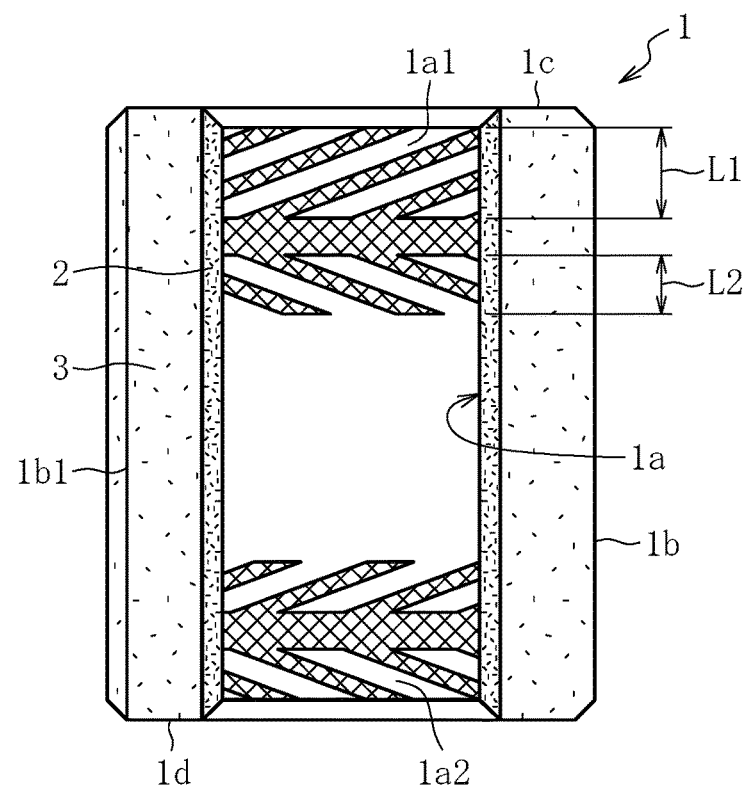
FIG. 1 is a sectional view for illustrating a sintered bearing according to an embodiment of the present invention.
Figure 2:
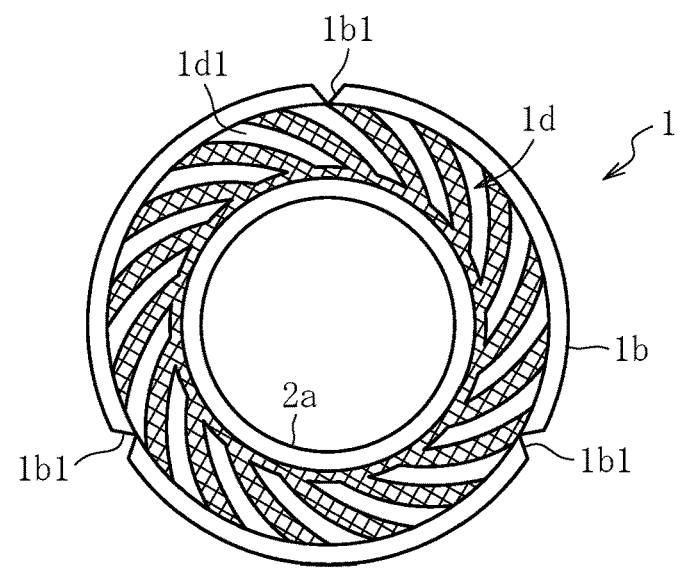
FIG. 2 is a bottom view for illustrating the sintered bearing.

As illustrated in FIG. 1 and FIG. 2, a sintered bearing 1 according to an embodiment of the present invention integrally comprises an inner layer 2 and an outer layer 3 each made of sintered metal and formed into a cylindrical shape (circular cylindrical shape in the illustrated example). In the illustrated example, the sintered bearing 1 is formed only of the inner layer 2 and the outer layer 3, and an outer peripheral surface of the inner layer 2 and an inner peripheral surface of the outer layer 3 are held in direct contact with each other. The following description is given with reference to a vertical direction of the drawing sheets. However, the following description is not intended to limit a mode of use of the sintered bearing 1.

The inner layer 2 is made of a material that is relatively likely to be plastically deformed, that is, a material having relatively low compressive yield strength. In this embodiment, the inner layer 2 is made of copper-based or copper-iron-based sintered metal. Specifically, the inner layer 2 is made of sintered metal containing 50 wt % or more (for example, 60 wt %) of copper or copper alloy, and 30 wt % or more (for example, 40 wt %) of iron or iron alloy (such as stainless steel).

The outer layer 3 is made of a material that is relatively less likely to be plastically deformed, that is, a material having compressive yield strength higher than that of the inner layer 2. In this embodiment, the outer layer 3 is made of sintered metal having a composition different from that of the inner layer 2. Specifically, the outer layer 3 is made of iron-based sintered metal, in particular, sintered metal containing 70 wt % or more of iron.

Dynamic pressure generating grooves serving as a radial dynamic pressure generating portion are formed in an inner peripheral surface 1a of the sintered bearing 1 (that is, in an inner peripheral surface of the inner layer 2). In this embodiment, in the inner peripheral surface 1a of the sintered bearing 1, dynamic pressure generating grooves 1a1 and 1a2 having a herringbone pattern are formed at two positions separated from each other in an axial direction. The upper dynamic pressure generating grooves 1a1 have an asymmetric pattern in the axial direction. Specifically, in the dynamic pressure generating grooves 1a1, an axial dimension L1 of an upper region with respect to an annular portion formed in a substantially axial center portion of a hill region (region indicated by cross-hatching in FIG. 1) is larger than an axial dimension L2 of a lower region with respect to the annular portion (L1>L2). Meanwhile, the lower dynamic pressure generating grooves 1a2 have a symmetric pattern in the axial direction.

An outer peripheral surface 1b of the sintered bearing 1 (that is, an outer peripheral surface of the outer layer 3) is formed into a smooth circular cylindrical surface. A plurality of (three in the illustrated example) axial grooves 1b1 arranged equiangularly are formed in the outer peripheral surface 1b of the sintered bearing 1 (see FIG. 2). An upper end surface 1c of the sintered bearing 1 is formed into a flat surface. Dynamic pressure generating grooves 1d1 serving as thrust dynamic pressure generating portions and having a spiral pattern are formed in a lower end surface 1d of the sintered bearing 1 (see FIG. 2).

A radial dimension (thickness) of the outer layer 3 is larger than a radial dimension (thickness) of the inner layer 2. It is only necessary that the inner layer 2 have a minimum thickness enabling forming of the dynamic pressure generating grooves 1a1 and 1a2. For example, the thickness of the inner layer 2 is equal to or smaller than 10% of a thickness of the sintered bearing 1, preferably equal to or smaller than 5% of the thickness of the sintered bearing 1. In the illustrated example, the inner layer 2 is formed within a radial region of chamfered portions formed at both upper and lower ends of the inner peripheral surface 1a of the sintered bearing 1. Thus, an entire region of the inner peripheral surface 1a of the sintered bearing 1 is formed of the inner layer 2, whereas entire regions of the outer peripheral surface 1b and both end surfaces 1c and 1d of the sintered bearing 1 are formed of the outer layer 3.

Next, a method of manufacturing the above-mentioned sintered bearing 1 is described. The sintered bearing 1 is manufactured through a compression molding step, a sintering step, a sizing step, and an oil impregnating step. Now, each step is described.

Figure 3:
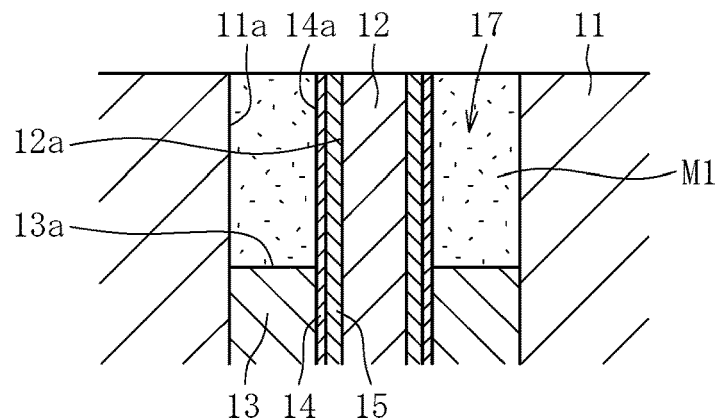
FIG. 3 is a sectional view for illustrating a state in which mixed metal powder for an outer layer is filled in a compression molding step among steps of manufacturing the sintered bearing.

The compression molding step is performed by so-called two-color molding in which a material for the inner layer 2 and a material for the outer layer 3 are fed into the same die assembly to be integrally molded. As illustrated in FIG. 3, a die assembly to be used in the compression molding step comprises a die 11, a core rod 12 arranged along an inner periphery of the die 11, an outer lower punch 13 arranged between an inner peripheral surface 11a of the die 11 and an outer peripheral surface 12a of the core rod 12, a partition plate 14, an inner lower punch 15, and an upper punch 16 (see FIG. 7). Forming patterns (not shown) for formation of form axial grooves in an outer peripheral surface of a compact 20 (see FIG. 7) are formed in the inner peripheral surface of the die 11. The outer lower punch 13, the partition plate 14, and the inner lower punch 15 are formed into coaxial circular cylindrical shapes, and can be raised and lowered independently of each other.

In the compression molding step, first, as illustrated in FIG. 3, the partition plate 14 and the inner lower punch 15 are raised to an upper end position, and the outer lower punch 13 is lowered to a lower end position. Thus, the inner peripheral surface 11a of the die 11, an outer peripheral surface 14a of the partition plate 14, and an end surface 13a of the outer lower punch 13 define an outer cavity 17 having a circular cylindrical shape. First mixed metal powder M1 for formation of the outer layer 3 is filled into the outer cavity 17. The first mixed metal powder M1 according to this embodiment is obtained by mixing tin powder or graphite powder with iron powder as needed. As iron powder of the first mixed metal powder M1, there may be used reduced iron powder, atomized iron powder, or electrolytic iron powder.

Figure 4:
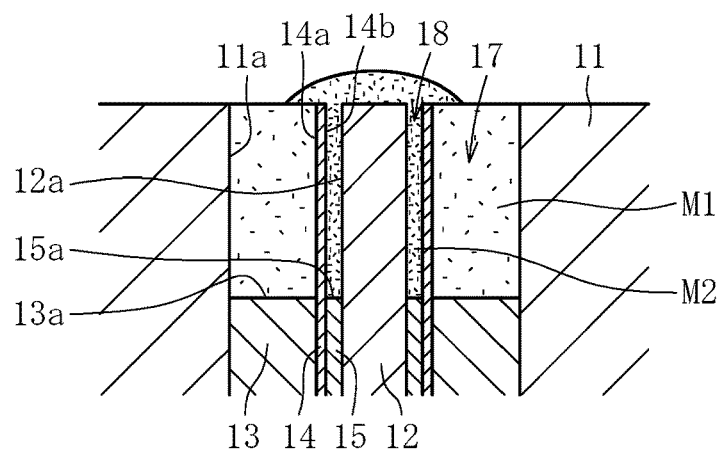
FIG. 4 is a sectional view for illustrating a state in which mixed metal powder for an inner layer is filled in the compression molding step.

Next, as illustrated in FIG. 4, the inner lower punch 15 is lowered to the lower end position. Thus, an inner peripheral surface 14b of the partition plate 14, the outer peripheral surface 12a of the core rod 12, and an end surface 15a of the inner lower punch 15 define an inner cavity 18 having a circular cylindrical shape. Second mixed metal powder M2 for formation of the inner layer 2 is filled into the inner cavity 18. At this time, the second mixed metal powder M2 is caused to overflow the inner cavity 18 so as to cover an upper side of the partition plate 14. The second mixed metal powder M2 according to this embodiment is obtained by mixing tin powder or graphite powder with iron powder and with copper powder or copper alloy powder as needed. As iron powder of the second mixed metal powder M2, there may be used reduced iron powder, atomized iron powder, or electrolytic iron powder. As copper powder of the second mixed metal powder M2, there may be used electrolytic copper powder or atomized copper powder. As copper alloy powder of the second mixed metal powder M2, there may be used diffusion alloyed copper powder obtained through diffusion bonding of copper and an alloy component, or atomized alloyed copper powder obtained through alloying of copper and an alloy component by an atomizing method.

Figure 5:
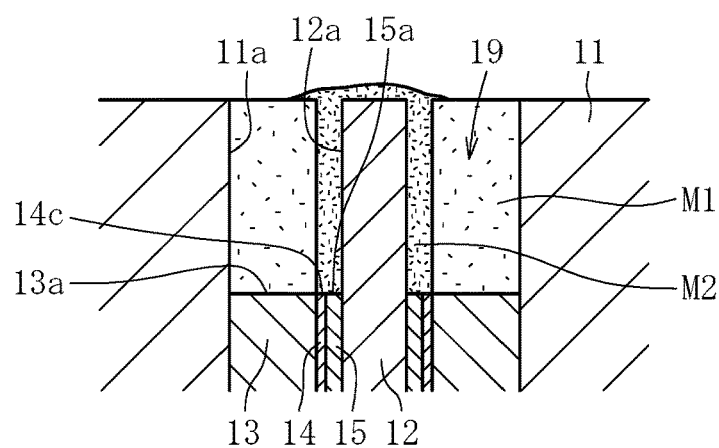
FIG. 5 is a sectional view for illustrating a state in which a partition plate is lowered in the compression molding step.
Figure 6:
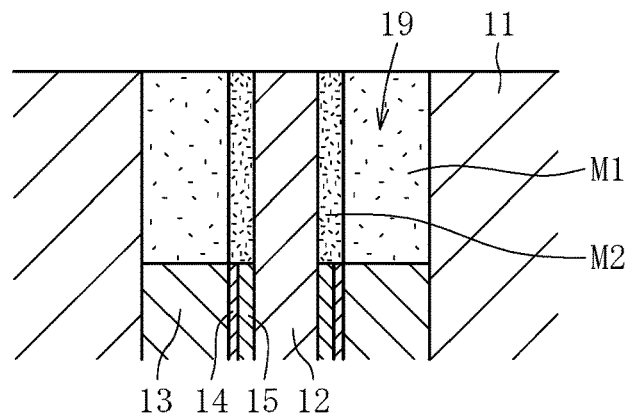
FIG. 6 is a sectional view for illustrating a state in which a surplus of the metal powder is removed in the compression molding step.

Next, as illustrated in FIG. 5, the partition plate 14 is lowered. In this manner, the second mixed metal powder M2 enters a space corresponding to the partition plate 14 so that the first mixed metal powder M1 and the second mixed metal powder M2 come into contact with each other. Thus, in a two-layer state, the first mixed metal powder M1 and the second mixed metal powder M2 fill a cavity 19 defined by the inner peripheral surface 11a of the die 11, the end surface 13a of the outer lower punch 13, an end surface 14c of the partition plate 14, the end surface 15a of the inner lower punch 15, and the outer peripheral surface 12a of the core rod 12. After that, a surplus of the second mixed metal powder M2 overflowing the cavity 19 is removed (see FIG. 6).

Figure 7:
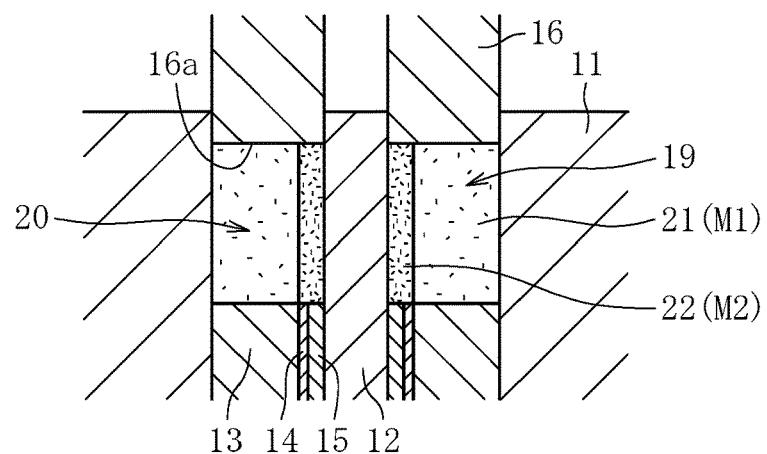
FIG. 7 is a sectional view for illustrating a state in which the mixed metal powders are compressed by an upper punch in the compression molding step.
Figure 8:
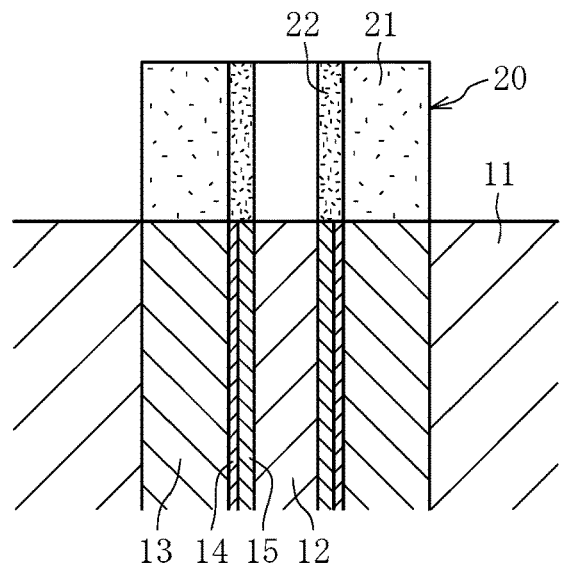
FIG. 8 is a sectional view for illustrating a state in which a compact is taken out of a die assembly in the compression molding step.

Then, as illustrated in FIG. 7, the upper punch 16 is lowered so as to compress from above, by an end surface 16a of the upper punch 16, the mixed metal powders M1 and M2 filled in the cavity 19, thereby forming the compact 20 comprising an outer layer 21 made of the first mixed metal powder M1 and an inner layer 22 made of the second mixed metal powder M2. Then, as illustrated in FIG. 8, the outer lower punch 13, the partition plate 14, and the inner lower punch 15 are raised, to thereby take the compact 20 out of the die assembly. An inner peripheral surface of the compact 20 is formed into a circular cylindrical surface, and both end surfaces of the compact 20 are each formed into a flat surface. Further, the axial grooves (not shown) are formed in the outer peripheral surface of the compact 20, and the chamfered portions (not shown) are formed in both upper and lower ends of the inner peripheral surface and the outer peripheral surface of the compact 20.

In the sintering step, the compact 20 is sintered at a predetermined temperature (for example, 870° C.), to thereby obtain a sintered body 30 (see FIG. 9) comprising an outer layer 31 and an inner layer 32.

In the sizing step, the sintered body 30 is formed to have predetermined dimensions, and the dynamic pressure generating grooves are die-formed in an inner peripheral surface 33 and one axial end surface 34 of the sintered body 30. In this embodiment, the sizing step is performed under a state in which the sintered bearing 1 illustrated in FIG. 1 is vertically inverted. Further, in FIG. 9 to FIG. 11, groove depths of forming patterns 41a1 and 41a2 and groove depths of the dynamic pressure generating grooves 1a1 and 1a2 are illustrated in an exaggerated manner.

Figure 9:
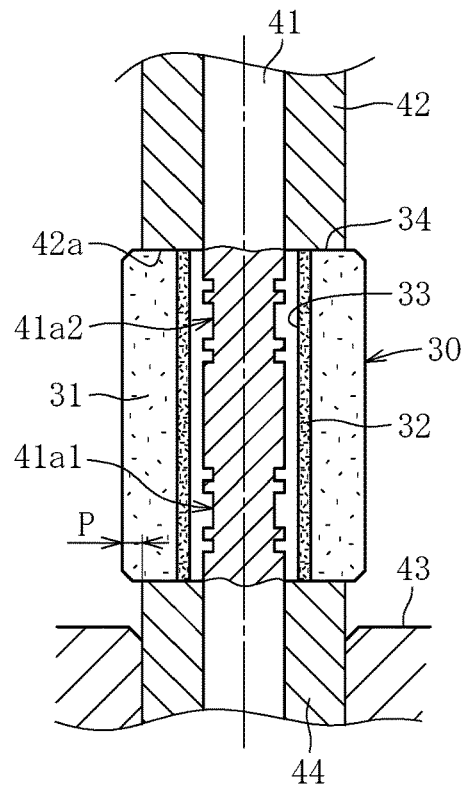
FIG. 9 is a sectional view for illustrating a state in which a core rod is inserted along an inner periphery of a sintered body in a sizing step for the sintered bearing.

First, as illustrated in FIG. 9, a core rod 41 is inserted along an inner periphery of the sintered body 30. The forming patterns 41a1 and 41a2 having shapes corresponding to the dynamic pressure generating grooves 1a1 and 1a2 are formed in an outer peripheral surface of the core rod 41. A radial gap is defined between the inner peripheral surface 33 of the sintered body 30 and the outer peripheral surface of the core rod 41.

Figure 10:
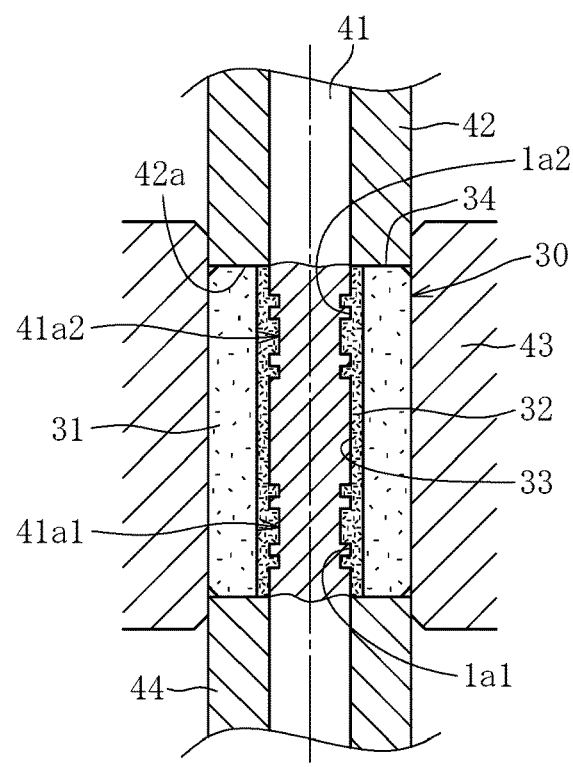
FIG. 10 is a sectional view for illustrating a state in which the sintered bearing is press-fitted into a die in the sizing step.

Then, as illustrated in FIG. 10, the sintered body 30 is pushed downward by an upper punch 42, and is press-fitted to an inner periphery of a die 43 under a state in which the core rod 41 remains inserted along the inner periphery of the sintered body 30. In this manner, the sintered body 30 is compressed from an outer periphery thereof by the die 43, and the inner peripheral surface 33 of the sintered body 30 is pressed onto the forming patterns 41a1 and 41a2 of the core rod 41. Consequently, the inner peripheral surface 33 of the sintered body 30 is plastically deformed, to thereby die-form the dynamic pressure generating grooves 1a1 and 1a2 in the inner peripheral surface 33. At this time, the inner layer 32 of the sintered body 30 is made of the material having relatively low compressive yield strength (copper-iron-based sintered metal in this embodiment), that is, the material that is likely to be plastically deformed. Accordingly, the dynamic pressure generating grooves 1a1 and 1a2 can be reliably die-formed in the inner peripheral surface 33 of the sintered body 30 by pressing the forming patterns 41a1 and 41a2 onto the inner layer 32 and plastically deforming the inner layer 32.

At the same time, a forming pattern (not shown) formed in a lower surface 42a of the upper punch 42 is pressed onto the end surface 34 of the sintered body 30, to thereby plastically deform the end surface 34. In this manner, the dynamic pressure generating grooves 1d1 (see FIG. 2) are die-formed in the end surface 34. Then, the upper punch 42 is lowered to a predetermined height, and is stopped after completion of press-fitting of the sintered body 30 into the die 43. In the above-mentioned manner, the sintered body 30 is formed to have the predetermined dimensions, and the dynamic pressure generating grooves 1a1, 1a2, and 1d1 are die-formed in the sintered body 30.

Figure 11:
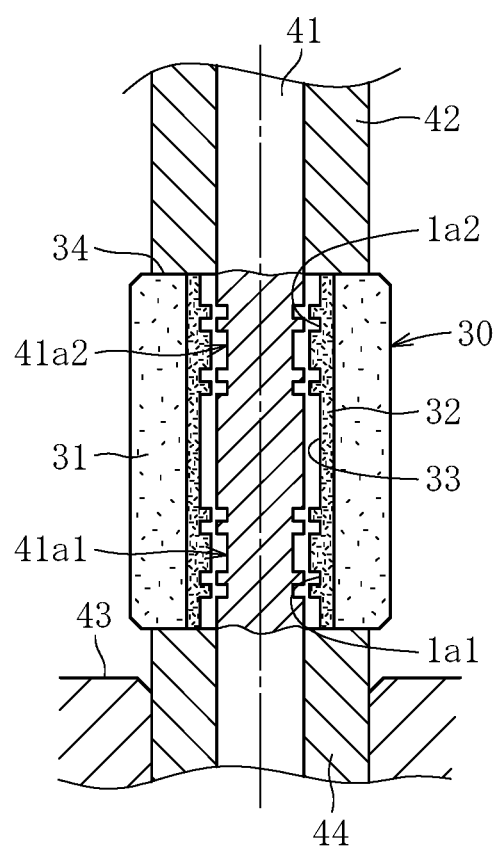
FIG. 11 is a sectional view for illustrating a state in which the sintered bearing is taken out of the die in the sizing step.

After that, as illustrated in FIG. 11, under the state in which the core rod 41 remains inserted along the inner periphery of the sintered body 30, the sintered body 30 is pushed upward by a lower punch 44 to be taken out from the inner periphery of the die 43. In this manner, the sintered body 30 is released from a compressive force that is inwardly applied to the sintered body 30 by the die 43, and the sintered body 30 is increased in diameter. As a result, the inner peripheral surface 33 of the sintered body 30 is separated from the outer peripheral surface of the core rod 41. At this time, the outer layer 31 of the sintered body 30 is made of the material having relatively high compressive yield strength (iron-based sintered metal in this embodiment), that is, a material having a wide elastic region. Accordingly, even when a degree of compressing the sintered body 30 by the die 43 is increased by increasing a dimensional difference (press-fitting tolerance P, see FIG. 9) between an outer diameter of the sintered body 30 and an inner diameter of the die 43, the sintered body 30 can be elastically restored through spring back. When the degree of compressing the sintered body 30 is increased as described above, the groove depths of the dynamic pressure generating grooves 1a1 and 1a2 to be formed in the inner peripheral surface 33 of the sintered body 30 can be increased. The spring back of the sintered body 30 cancels an axially engaged state between the inner peripheral surface 33 (dynamic pressure generating grooves 1a1 and 1a2) of the sintered body 30 and the outer peripheral surface (forming patterns 41a1 and 41a2) of the core rod 41. After that, the core rod 41 is pulled out from the inner periphery of the sintered body 30, thereby separating the sintered body 30 from the die assembly.

An oil as lubricating fluid is impregnated into internal pores of the sintered body 30 subjected to the sizing step in the above-mentioned manner. Thus, the sintered bearing 1 is completed.

Figure 12:
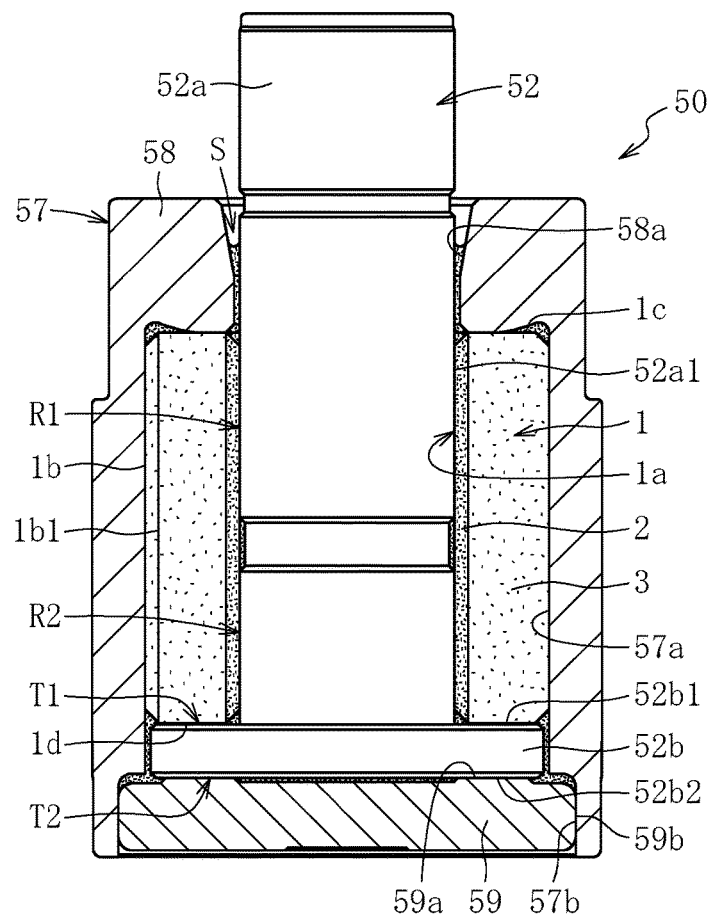
FIG. 12 is a sectional view for illustrating a fluid dynamic bearing device comprising the sintered bearing.

The above-mentioned sintered bearing 1 is incorporated into, for example, a fluid dynamic bearing device 50 illustrated in FIG. 12. The fluid dynamic bearing device 50 mainly comprises the sintered bearing 1, a shaft member 52 inserted along the inner periphery of the sintered bearing 1, a cylindrical housing 57 in which the sintered bearing 1 is fixed along an inner peripheral surface of the housing 57, a lid member 59 configured to close an opening portion of the housing 57 on one axial end side thereof, and a seal portion 58 formed at an opening portion of the housing 57 on another axial end side thereof. In this embodiment, the housing 57 and the seal portion 58 are formed integrally with each other.

The shaft member 52 is made of a metal material such as stainless steel, and comprises a shaft portion 52a, and a flange portion 52b formed at a lower end of the shaft portion 52a.

The housing 57 is made of a resin or metal. In this embodiment, the housing 57 is formed by injection molding of a resin together with the seal portion 58. The housing 57 has a circular cylindrical shape having openings formed in both axial ends thereof. An inner peripheral surface of the housing 57 comprises a small-diameter inner peripheral surface 57a, and a large-diameter inner peripheral surface 57b formed below the small-diameter inner peripheral surface 57a and having a diameter larger than that of the small-diameter inner peripheral surface 57a. The outer peripheral surface 1b of the sintered bearing 1 is fixed on the small-diameter inner peripheral surface 57a by an appropriate measure such as bonding or press-fitting. An outer peripheral surface 59b of the lid member 59 is fixed on the large-diameter inner peripheral surface 57b by an appropriate measure such as bonding or press-fitting.

The lid member 59 is made of metal or a resin, and is formed into a disk shape. In an upper end surface 59a of the lid member 59, dynamic pressure generating grooves (not shown) having a spiral pattern are formed.

The seal portion 58 is formed in the opening portion of the housing 57 at the upper end thereof. An inner peripheral surface 58a of the seal portion 58 has a tapered shape extending upward to be gradually increased in diameter. Between the inner peripheral surface 58a of the seal portion 58 and an outer peripheral surface 52a1 of the shaft portion 52a, a seal space S is formed to have a wedge-shaped cross-section extending downward to be gradually decreased in radial width.

An oil is injected into the fluid dynamic bearing device 50 comprising the above-mentioned components. In this manner, an internal space of the housing 57 including the internal pores of the sintered bearing 1 is filled with the oil, and an oil surface is always maintained within the seal space S.

When the shaft member 52 is rotated, a radial bearing gap is defined between the inner peripheral surface 1a (region where the dynamic pressure generating grooves 1a1 and 1a2 are formed) of the sintered bearing 1 and the outer peripheral surface 52a1 of the shaft portion 52a. Further, a pressure of an oil film in the radial bearing gap is increased by the dynamic pressure generating grooves 1a1 and 1a2. Owing to this dynamic pressure generating action, there are formed a first radial bearing portion R1 and a second radial bearing portion R2 configured to rotatably support the shaft portion 52a in a non-contact manner.

At the same time, thrust bearing gaps are defined between an upper end surface 52b1 of the flange portion 52b and the lower end surface 1d (region where the dynamic pressure generating grooves 1d1 are formed) of the sintered bearing 1, and between a lower end surface 52b2 of the flange portion 52b and the upper end surface 59a (region where the dynamic pressure generating grooves are formed) of the lid member 59. Further, a pressure of an oil film in each of the thrust bearing gaps is increased by the dynamic pressure generating grooves 1d1 of the sintered bearing 1 and the dynamic pressure generating grooves of the lid member 59. Owing to this dynamic pressure generating action, there are formed a first thrust bearing portion T1 and a second thrust bearing portion T2 configured to rotatably support the flange portion 52b in both thrust directions in a non-contact manner.

At this time, it is preferred that a size of the radial bearing gap defined between the inner peripheral surface 1a of the sintered bearing 1 and the outer peripheral surface 52a1 of the shaft portion 52a be equivalent to the groove depths of the dynamic pressure generating grooves 1a1 and 1a2 formed in the inner peripheral surface 1a of the sintered bearing 1 (for example, 0.8 to 1.2 times larger than the groove depths of the dynamic pressure generating grooves 1a1 and 1a2). This is because this configuration maximizes the pressure of the oil film generated in the radial bearing gap to increase bearing rigidity in a radial direction. In this embodiment, as described above, the outer layer 3 having high compressive yield strength is formed in the sintered bearing 1. Thus, an amount of the spring back of the sintered body 30 is increased, and the dynamic pressure generating grooves 1a1 and 1a2 having the large groove depths are formed owing to the increase in the spring back. The size of the radial bearing gap can be increased in accordance with the increase in the groove depths of the dynamic pressure generating grooves 1a1 and 1a2. Accordingly, torque increase and rubbing between the inner peripheral surface 1a of the sintered bearing 1 and the outer peripheral surface 52a1 of the shaft portion 52a can be avoided. Further, the inner layer 2 having low compressive yield strength is formed in the sintered bearing 1. With this configuration, the inner layer 2 is likely to be plastically deformed, and the dynamic pressure generating grooves 1a1 and 1a2 can be reliably formed. Accordingly, the pressure of the oil film in the radial bearing gap can be efficiently increased, thereby being capable of improving the bearing rigidity.

Figure 13:
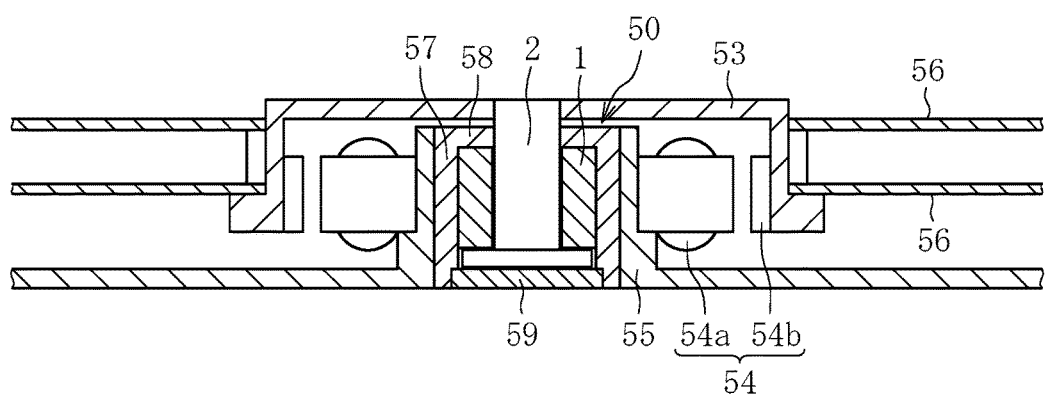
FIG. 13 is a sectional view for illustrating a spindle motor comprising the fluid dynamic bearing device.

The above-mentioned fluid dynamic bearing device 50 is incorporated into, for example, a spindle motor illustrated in FIG. 13. The spindle motor is used for a disk drive such as an HDD. The spindle motor comprises the fluid dynamic bearing device 50, a disk hub 53 fixed to the shaft member 52 of the fluid dynamic bearing device 50, a drive unit 54 comprising a stator coil 54a and a rotor magnet 54b, and a bracket 55. The stator coil 54a is fixed to the bracket 55, and the rotor magnet 54b is fixed to the disk hub 53. The fluid dynamic bearing device 50 is fixed on an inner periphery of the bracket 55. The disk hub 53 holds a predetermined number of disks 56 (two disks in the illustrated example). When the stator coil 54a is energized, the rotor magnet 54b is rotated, thereby causing the disks 56 held on the disk hub 53 to rotate integrally with the shaft member 52.

The present invention is not limited to the above-mentioned embodiment. For example, in the above-mentioned embodiment, description is given of the case where the inner layer 2 and the outer layer 3 of the sintered bearing 1 are made of different materials so that the inner layer 2 and the outer layer 3 are different from each other in compressive yield strength. However, the present invention is not limited thereto. For example, density of the inner layer 2 may be set to be lower than density of the outer layer 3 so that the inner layer 2 and the outer layer 3 are different from each other in compressive yield strength. For example, a grain diameter (such as an average grain diameter) of metal powder for the outer layer 3 is set to be larger than a grain diameter of metal powder for the inner layer 2, thereby setting the density of the outer layer 3 to be higher than the density of the inner layer 2. In this manner, compressive yield strength of the outer layer 3 can be set to be higher than compressive yield strength of the inner layer 2. In this case, the inner layer 2 and the outer layer 3 may be made of sintered metal having the same composition. Alternatively, the inner layer 2 and the outer layer 3 may be made of the same materials as those in the above-mentioned embodiment, and the density of the outer layer 3 may be set to be higher than the density of the inner layer 2.

In the above-mentioned embodiment, description is given of the case where, as the radial dynamic pressure generating portion, the dynamic pressure generating grooves 1a1 and 1a2 having a herringbone pattern are formed in the inner peripheral surface 1a of the sintered bearing 1. However, the present invention is not limited thereto. As the radial dynamic pressure generating portion, dynamic pressure generating grooves having another pattern such as a spiral pattern may be formed. In addition, the radial dynamic pressure generating portion may be formed in a so-called multi-arc bearing comprising a plurality of partial circular cylindrical surfaces connected to one another in a circumferential direction, or in a step bearing having a plurality of axial grooves formed therein equiangularly. Further, in the above-mentioned embodiment, the dynamic pressure generating grooves 1a1 and 1a2 are formed in the inner peripheral surface 1a of the sintered bearing 1 at the two positions separated from each other in the axial direction. However, the dynamic pressure generating grooves may be formed continuously in the axial direction, or the dynamic pressure generating grooves may be formed only at one position in the axial direction.

In the above-mentioned embodiment, description is given of the case where the dynamic pressure generating grooves 1d1 having a spiral pattern as the thrust dynamic pressure generating portions are formed in the end surface 1d of the sintered bearing 1. However, the present invention is not limited thereto. The thrust dynamic pressure generating portions may be constructed of dynamic pressure generating grooves having another shape, such as a herringbone pattern, or step bearings. Further, the end surface 1d of the sintered bearing 1 may be formed into a flat surface, and thrust dynamic pressure generating portions may be formed in the upper end surface 52b1 of the flange portion 52b of the shaft member 52, which is opposed to the end surface 1d of the sintered bearing 1.

The above-mentioned sintered bearing 1 is applicable not only to the fluid dynamic bearing device 50 of a shaft rotation type, which is configured to support rotation of the shaft member, but also to a fluid dynamic bearing device of a shaft fixing type, in which the shaft member is fixed and the sintered bearing 1 is rotated, or a fluid dynamic bearing device in which both the shaft member and the sintered bearing are rotated.

The above-mentioned sintered bearing 1 is applicable not only to a spindle motor for an HDD, but also to a spindle motor for other information equipment, a polygon scanner motor for a laser beam printer, a color wheel for a projector, or a fan motor for an electrical apparatus.

The invention claimed is:

1. A sintered bearing, comprising:
   an inner layer and an outer layer each made of sintered metal and formed into a cylindrical shape; and
   a radial dynamic pressure generating portion die-formed in an inner peripheral surface of the inner layer,
   wherein the inner layer is made of copper-iron-based sintered metal containing 30 wt % or more of copper and 30 wt % or more of iron, and the outer layer is made of iron-based sintered metal containing 50 wt % or more of iron, and
   wherein the outer layer has a compressive yield strength higher than a compressive yield strength of the inner layer.

2. The sintered bearing according to claim 1, wherein the outer layer has a radial dimension larger than a radial dimension of the inner layer.

3. The sintered bearing according to claim 1, wherein the inner layer has a density lower than a density of the outer layer.

4. A fluid dynamic bearing device, comprising:
   the sintered bearing according to claim 1; and
   a shaft member inserted along an inner periphery of the sintered bearing, the shaft member being relatively rotatably supported by dynamic pressure generating action of a fluid film generated in a radial bearing gap defined between an inner peripheral surface of the sintered bearing and an outer peripheral surface of the shaft member.

5. A sintered bearing manufacturing method, comprising:
   a compression molding step of subjecting metal powder to compression molding to form a compact integrally comprising: a cylindrical inner layer containing 30 wt % or more of copper and 30 wt % or more of iron; and an outer layer containing 50 wt % or more of iron, the outer layer having a compressive yield strength higher than a compressive yield strength of the cylindrical inner layer;
   a sintering step of sintering the compact to form a sintered body; and
   a sizing step of die-forming a radial dynamic pressure generating portion in an inner peripheral surface of the sintered body,
   the sizing step comprising:
      inserting a core rod, which has a forming pattern formed in an outer peripheral surface thereof, along an inner periphery of the sintered body;
      die-forming the radial dynamic pressure generating portion by press-fitting the sintered body to an inner periphery of a die under a state in which the core rod remains inserted along the inner periphery of the sintered body, compressing the sintered body from an outer periphery thereof to press the inner peripheral surface of the sintered body onto the forming pattern of the core rod, and plastically deforming the inner peripheral surface of the sintered body;

separating the inner peripheral surface of the sintered body from the forming pattern of the core rod by taking out the sintered body from the inner periphery of the die under a state in which the core rod remains inserted along the inner periphery of the sintered body to increase the inner peripheral surface of the sintered body in diameter; and separating the sintered body and the core rod from each other.

\* \* \* \* \*